United States Patent Office 2,699,455
Patented Jan. 11, 1955

2,699,455

ISOLATION OF GAMMA BENZENE HEXACHLORIDE

Keith J. Smith and James S. Sconce, Niagara Falls, N. Y., assignors to Hooker Electrochemical Company, Niagara Falls, N. Y., a corporation of New York No Drawing. Application March 1, 1948,
Serial No. 12,466

8 Claims. (Cl. 260—648)

The present invention relates to a novel method for the recovery, in substantially pure form, of a specific isomer of hexachlorocyclohexane from products such as are obtained by the chlorination of benzene, et cetera, containing a mixture of hexachlorocyclohexane isomers. The invention is more particularly concerned with a method for the isolation of substantially pure γ-hexachlorocyclohexane from a mixture of hexachlorocyclohexane isomers including at least the γ- and α-hexachlorocyclohexane isomers. The invention is particularly applicable to the separation of γ-hexachlorocyclohexane from commercial crude hexachlorocyclohexane.

INTRODUCTION

Hexachlorocyclohexane, often called "benzene hexachloride" or "666," and the various isomers thereof have been known for some time. Michael Faraday appears to have been the first to prepare hexachlorocyclohexane, obtaining his product by the chlorination of bi-carburet of hydrogen (benzene) in sunlight. Mitscherlich described the decomposition of hexachlorocyclohexane to trichlorobenzene by means of bases in 1833. Peligot and Laurent settled the composition of hexachlorocyclohexane in 1836. Meunier in 1887 showed that hexachlorocyclohexane contained two isomers, the α, melting at 157 degrees centigrade, and the β, melting at a much higher temperature. In 1912, van der Linden established the existence of four isomers, the α, β, γ, and δ. Since that time other workers have established the existence of the ε isomer.

Processes for the production of hexachlorocyclohexane have been described in United States patents to Bender 2,010,841 and to Hardie 2,218,148, and in British Patents 447,058 and 504,569. Still another process for chlorinating benzene to produce hexachlorocyclohexane containing an enhanced proportion of the γ isomer is disclosed in application for United States patent of Stormon, Serial 749,366, filed May 20, 1947, now U. S. Patent 2,499,120.

Crude hexachlorocyclohexane produced in accordance with the processes of the above disclosures may contain the various isomers in the following percentages:

| Isomer: | Per cent |
| --- | --- |
| Alpha-hexachlorocyclohexane | 60–75 |
| Beta-hexachlorocyclohexane | 5–12 |
| Gamma-hexachlorocyclohexane | 8–16 |
| Delta-hexachlorocyclohexane | 5–12 |
| Epsilon-hexachlorocyclohexane | 1–3 |
| Heptachlorocyclohexane and other impurities | 0–5 |

Of the various isomers of hexachlorohexane, only the γ isomer has been shown to possess insecticidal activity of a usable degree. This γ isomer, the active principle of any hexachlorocyclohexane mixture of isomers, is stated by Slade in "Chemical Trade Journal and Chemical Engineer" for March 16, 1945, at page 279, to be present to the extent of 10–12 per cent in the crude material. Investigators in this country, following the procedure of the Storman application referred to above, have been able to prepare hexachlorocyclohexane compositions containing as high as 16 per cent of γ by weight in the crude mixture of isomers.

Naturally, since the γ isomer of hexachlorocyclohexane is the most active principle of any isomeric mixture of hexachlorocyclohexanes, considerable attention has been devoted to the problem of separating the γ isomer from its mixtures with other isomers. Such separation is desor to enhance the proportion of γ isomer in other mixtures. The insecticidally active isomer, γ-1,2,3,4,5,6-hexachlorocyclohexane, is often referred to as "gammexane" (Slade, "Chemical Trade Journal and Chemical Engineer" for March 16, 1945, page 279, "Canadian Chemistry and Process Industries," January 1946, page 30).

SEPARATION OF THE ISOMERS

Separation of isomers of hexachlorocyclohexane is not broadly new. As stated above, Meunier in 1887, showed that hexachlorocyclohexane contained two isomers, the α and β. F. E. Matthews (J. Chem. Soc. 59, 165 (1891)) disclosed a method for roughly separating the α and β isomers by steam distillation, followed by purification and concentration by recrystallization from alcohol or sirable to obtain the pure γ for use as an insecticide per se, acetic acid, as early as 1891. In his publication of 1912, van der Linden (Berichte 45, 231 (1912)) repeated the work of Matthews and reported substantially the same results, also disclosing the γ and δ isomers. The separation of these isomers likewise involved the employment of ether, alcohol and/or acetic acid. After van der Linden's work, interest in the separation of the isomers appears to have waned for several decades.

According to "Canadian Chemistry and Process Industries," January 1946, at page 30, Burrage et al. succeeded in isolating a substantially pure γ-hexachlorocyclohexane isomer and determining that the insecticidal value of hexachlorocyclohexane appeared to be almost entirely due to this form.

The method of Burrage et al., referred to in this publication, is presumably the procedure of British Patent 573,693, granted December 27, 1945, to Burrage and Smart. Up to this time, with the exception of Matthews and van der Linden, the prior art of separating isomeric hexachlorocyclohexanes was substantially as stated in British Patent 573,693:

"Hitherto the γ-isomer has been obtained by continuing the chlorination of the benzene until a slurry of α-benzene hexachloride is formed which is filtered off, and the other isomers present are obtained from the mother liquor by fractional crystallisation. This mother liquor, of course, is saturated with the α-isomer, and in addition to the β- and γ-isomers will contain any small amounts of chlorine-substituted benzene hexachlorides, for example, monochlorobenzene hexachloride, which may be formed. On fractional crystallisation some of the α-isomer crystallises with the γ-isomer, making the isolation of the latter difficult, and the method troublesome to carry out."

The method of the British patent appears very similar to that of van der Linden. While producing the γ-hexachlorocyclohexane isomer in substantially pure form, it is, however, generally unsatisfactory from the point of view of the yield of pure γ which can be obtained from a mixture of isomers in a single simple operation. It sometimes requires several repetitions or crystallizations to produce a product of satisfactory γ content and each single separation usually produces yields of this isomer which are less than desirable for economical operation.

This process, which we have found lacking satisfactory commercial application, is described in the British patent as follows:

"We have now found that the γ-isomer of benzene hexachloride can be recovered from crude benzene hexachloride by extracting it in the cold with a lower aliphatic alcohol such as methanol or ethanol. The α-isomer has but a very small solubility in the lower aliphatic alcohols, as compared with the γ-isomer, and in addition this solubility appears to be depressed by the presence of the γ-isomer, so that substantially none of the α-isomer dissolves unless more than enough solvent is used to dissolve all of the γ. Thus a separation of the γ-isomer from the α can be achieved. The β-isomer or other bodies present in the crude benzene hexachloride will also be present in the extract containing the γ-isomer, but on fractional crystallisation of the solution the γ-isomer is deposited first, and can thus be recovered separately. On the other hand, if the presence of these other bodies is not objectionable, the whole of the solids may be recovered from solution together."

\* \* \* \* \*

"Preferably such an amount of the lower aliphatic alcohol is used to carry out the extraction that substantially all of the γ-isomer is dissolved, and substantially none of the α-isomer. However, if the presence of small amounts of the α-isomer is not objectionable rather more of the alcohol may be used, and a corresponding proportion of the α-isomer will then be present in the extract together with the γ-isomer."

\* \* \* \* \*

"When the alcohol is used in amounts such that no α-isomer dissolves fractional crystallisation will then yield initial fractions of substantially pure γ-isomers, whereas if the extract contains some α-isomer this will form the first fraction or fractions, and the γ-isomer will crystallise out next. Using methyl alcohol, an amount up to an equal weight of the crude benzene hexachloride from which unchanged benzene has been removed can be used to perform the extraction without dissolving any substantial amount of the α-isomer, and approximately 60% of the alcohol can then be removed from the extract without causing the precipitation of substantial amounts of material other than the γ-isomer."

\* \* \* \* \*

"The precipitated benzene hexachloride is filtered off from the water, dried at 30° C to 35° C. ground, and then treated with between 0.5 and 1.0 times its weight of cold methanol with agitation for some time, for example 24 hours, and the resultant solution filtered off."

In the single example given in the British Patent 573,693, the ratio of methanol to the crude benzene hexachloride is 0.83 part to 1. In this example, 24 parts of dried benzene hexachloride yielded 0.7 part of the γ-isomer, and this, calculated on the basis of the 10 to 12 per cent γ reported to be present in the crude by Slade, "Chemical Trade Journal and Chemical Engineer," cited above, makes the yield of γ, calculated on the γ present in the crude mixture, between 24 per cent (if 12 per cent γ was present) and 29 per cent (if 10 per cent was present in the crude). If more than 12 per cent γ was present in the crude mixture, then the recovery of the γ would appear to be proportionately less.

Thus, the procedure of the British patent appears to depend upon the following factors:

(1) Alleged relative insolubility of the α isomer, in the presence of the γ isomer.

(2) Alleged possibilty of leaving α undissolved while dissolving γ.

(3) Alleged possibility of precipitating the γ isomer from a solution which is substantially free from the α isomer.

OBJECTS OF THE PRESENT INVENTION

It is an object of the present invention to provide a process for the isolation of substantially pure γ-hexachlorocyclohexane from a composition including the γ and at least the α isomer of hexachlorocyclohexane. It is a further object of the present invention to provide such a process which may be conducted in a simple manner to give higher yields of substantially pure γ-hexachlorocyclohexane than have been previously obtainable by any known process. An additional object of the present invention is to provide such a process where substantially pure γ-hexachlorocyclohexane is crystallized from a solution containing a substantial proportion of the α-hexachlorocyclohexane isomer. Another objective of the invention is the provision of a process for the isolation of substantially pure γ-hexachlorocyclohexane from a substantially anhydrous solution which is supersaturated with respect to at least the α-hexachlorocyclohexane isomer. A further object of the invention is the provision of such a process wherein substantially pure γ-hexachlorocyclohexane is isolated from a methanol solution of the γ which is supersaturated at least with regard to the α isomer of hexachlorocyclohexane.

THE NEW PROCESS, GENERAL CONSIDERATIONS

The teaching of the British patent is that the solubility of the α isomer of hexachlorocyclohexane is depressed by the presence of the γ isomer and that, if the alcoholic extract does contain some α, in addition to the γ, then the α will precipitate first. Accordingly, the theory of operation is: In order to obtain a fraction of high γ content, one must repetitively use a limited ratio of solvent to crude hexachlorocyclohexane calculated to dissolve some γ present in the crude and avoid extraction of α.

We have now found that, contrary to the teaching of the British patent, the solubility in methyl alcohol and other solvents of the α isomer is not depressed by the presence of the γ isomer. Rather, it is increased. This finding would indicate the impracticality of the British patent procedure and tend to show the undesirability of attempting to use high ratios of solvent to crude hexachlorocyclohexane, since it is not possible to extract from the crude all of the γ isomer therein without dissolving a substantial proportion of the α isomer, amounting to at least one-third of the weight of extracted γ, particularly in a single extraction.

However, we have also made the critical and unexpected finding, again apparently contrary to the British teaching, that, from an extract of γ isomer containing a substantial proportion of the α isomer, there can be crystallized a first fraction of pure γ. This latter finding is conditioned upon treating the extract of γ containing the α, as by concentration or chilling, so as first to form a solution supersaturated with respect to the α isomer.

The present invention then includes: treating a substantially anhydrous solution of at least the α- and γ-hexachlorocyclohexane isomers to produce a solution which is supersaturated with respect to at least the α isomer; and, separating the γ isomer which crystallizes from solution before any substantial amount of α or other hexachlorocyclohexane isomer crystallizes from the solution.

SOLVENTS

While the solvent employed in the process as above-described is substantially anhydrous methanol, it is to be understood that other substantially anhydrous organic solvents may likewise be employed. For example, methyl ethyl ketone, methal, or lower aliphatic monohydric alcohols such as ethanol, n-propanol, or isopropanol may be used. The process is equally operative when these other solvents are employed, but methanol is to be understood as constituting the preferred embodiment of the invention.

QUANTITY OF EXTRACTING SOLVENT

The weight ratio of solvent to crude hexachlorocyclohexane may be as low as 1.1 to 1.0. The procedure is more advantageously conducted when the ratio of solvent to crude hexachlorocyclohexane is at least about 1.1 to 1.0, which is a critical lower limit, since below this ratio the quantity of γ isomer extracted from the crude falls off sharply, and is most advantageously conducted at a ratio of about 1.5–1.6 to 1.0. For example, in the extraction of a crude hexachlorocyclohexane mixture containing 13.8 per cent by weight of the γ isomer, a ratio of methanol to crude hexachlorocyclohexane of 0.7 to 1.0 was found to extract only 4.19 grams of the γ isomer, while a ratio of 1.1 to 1.0 extracted 6.20 grams of the γ isomer and a ratio of 1.5 to 1.0 extracted 6.82 grams of the γ isomer, accompanied by about 10 per cent of the α isomer present in the crude. Since the original crude hexachlorocyclohexane mixture contained only 6.90 grams of the γ isomer, it is apparent that the ratio of 1.5 to 1.0 allowed extraction of 97 per cent of the γ isomer, while the other ratios of methanol to crude hexachlorocyclohexane allowed correspondingly less efficient extractions. It is there preferable to operate the new process with a solvent to crude hexachlorocyclohexane weight ratio in excess of about 1.1 to 1.0, assuming that the amount of γ isomer in a crude mixture is between about 10 and 16 per cent of the total weight of the hexachlorocyclohexane isomers.

OTHER CONDITIONS FOR EFFECTING SOLUTION

Agitation is desirable for obtaining a solution of the γ and at least the α isomers of hexachlorocyclohexane. The temperature at which the solution is obtained may be varied over a considerable range, and any convenient or suitable temperature may be employed. Such a convenient temperature is at or in the vicinity of room temperature, e. g., 20–30 degrees centigrade. The solvent employed, for best results, should be substantially anhydrous. The time required to obtain complete solution will, of course, vary somewhat with the temperature, vigor of agitation, and quantity of solvent employed, but even at a temperature of about 20 degrees centigrade it is usually unnecessary to agitate the crude hexachlorocyclohexane and solvent for a period much in excess of about one hour. The solution may be prepared in any suitable apparatus, for example, an iron vessel equipped with an agitator.

At the end of the agitation, or, if agitation is not employed, the period allowed for solution to be obtained, a condition of saturation is established in the extracting solution. This means that the methanol is saturated with respect to the $\gamma$ and at least the $\alpha$ isomer.

This mixture, consisting of the liquid containing dissolved isomers and the undissolved crude hexachlorocyclohexane, may be filtered at room temperature to remove the undissolved solids. A suitable filter aid may be employed, if desired, but is not always necessary. The filter cake may be washed with an additional amount of solvent to remove substantially all of the $\gamma$ isomer which may be occluded in the filter cake. The wash solution may then be recycled to the extraction step or it may be combined with the filtrate from the previous step, and the combined solution concentrated to supersaturation with regard to the $\alpha$ isomer in the next step of the process.

The combined filtrates contain substantially all of the $\alpha$ isomer present in the original crude hexachlorocyclohexane mixture, depending, as previously stated, on the ratio of solvent to the crude mixture of isomers, which ratio may be as high as 3.0 to 1.0. This solution is not necessarily saturated with respect to all of the isomers.

CONCENTRATION OF THE SOLUTION

The solution may then be heated to its boiling point, or any point in the vicinity thereof which allows the evaporation of solvent therefrom, e. g., about 68 degrees centigrade, when methanol is employed, and about one-fifth to two-thirds of the solvent thus evaporated from the solution. This evaporated solvent may be condensed and recovered for reuse in the process. The exact quantity of solvent which is evaporated is immaterial, as it is only necessary to evaporate sufficient of the methanol so that the remaining solution when cooled will be supersaturated at least with respect to the $\alpha$-hexachlorocyclohexane isomer. Agitation of the solution during the evaporation step is not essential, but is desirable as it increases the rate of evaporation. A convenient apparatus for conducting this evaporation step is an enamel-lined evaporator provided with an agitator. Vacuum may be used, if desired, to assist the solvent evaporation. The use of vacuum causes the $\gamma$ isomer to crystallize in larger crystals, which is sometimes desirable.

CHILLING OF THE SOLUTION

The $\gamma$ isomer of hexachlorocyclohexane may be recovered from the solution thereof saturated with respect to at least the $\gamma$ and $\alpha$ isomers as by drastic chilling, rather than by evaporation of the solvent, if desired. By chilling to temperatures down to the freezing point of the solvent employed, solutions supersaturated with respect to the $\alpha$ isomer can be obtained and a first crop of pure $\gamma$ isomer crystallized from such solutions.

COMBINATION RECOVERY

A combination concentration and chilling procedure may be followed. Thus, the removal of some solvent may be accomplished by evaporation and a state of supersaturation with respect to the $\alpha$ isomer can then be produced in the solution by cooling to temperatures approximating room temperature.

ILLUSTRATIVE

The following examples are given to illustrate the procedure of the present invention, but are in no way to be construed as limiting. The parts are by weight unless otherwise specified.

Example 1

Eighteen hundred parts of crude hexachlorocyclohexane having the following composition:

| Isomer: | Per cent |
|---|---|
| Alpha | 64.8 |
| Beta | 9.7 |
| Gamma | 13.4 |
| Delta | 8.9 |
| Epsilon | 2.2 |
| Impurities | 1.0 | were mixed with 2446 parts of substantially anhydrous methanol in an iron vessel. The mixture was agitated for a period of about one hour at a temperature of 20 degrees centigrade, and then filtered to remove 1260 parts of undissolved solids, dry weight, consisting almost entirely of the $\alpha$ and $\beta$ isomers. The filter cake was then washed with 159 parts of methanol to remove $\gamma$-containing mother liquor from the crystals. The original filtrate and methanol wash were charged into an enamel-lined evaporator provided with an agitator, a condensing system, and heating and/or cooling means, wherein 660 parts of the methanol was evaporated at a temperature of about 68 degrees centigrade and subsequently recovered for further use. The solution remaining in the evaporator was cooled to approximately 20 degrees centigrade with mild swirling agitation over a period of about one hour, at the end of which time the solution was filtered. One hundred forty-nine parts of 96.8 per cent $\gamma$-hexachlorocyclohexane were recovered, representing a yield of 63.7 per cent of the 234 parts of $\gamma$-hexachlorocyclohexane in the starting crude mixture.

Example 2

In a manner similar to that given above, 1690 parts of crude hexachlorocyclohexane, having an average $\gamma$-hexachlorocyclohexane content of 13.5 per cent, were extracted with 2512 parts of substantially anhydrous methanol. The hexachlorocyclohexane was agitated with methanol for a period of about one hour at 20 degrees centigrade. At this point, 1183 parts of undissolved solids, dry weight, were removed by filtration, and found to consist of the $\alpha$ and $\beta$ isomers. The filter cake was then washed with 159 parts of methanol to remove $\gamma$-containing mother liquor. The combined solutions were evaporated at a temperature of about 68 degrees centigrade until 1060 parts of methanol had been evaporated and recovered for further use. The solution was then cooled with gentle swirling agitation over a period of about one hour at approximately 20 degrees centigrade and substantially pure $\gamma$-hexachlorocyclohexane, which precipitated from solution, separated therefrom. In this manner 132 parts $\gamma$-hexachlorocyclohexane melting at 113 degrees centigrade were recovered, representing a yield of 57.9 per cent of the 228 pounds of $\gamma$ in the starting crude mixture.

Example 3.—Ethanol as solvent.

One kilogram of crude hexachlorocyclohexane containing 13.5 per cent $\gamma$ isomer was mixed with one and one-half kilograms of substantially anhydrous ethanol. (A ratio of 11.1 ethanol to one of $\gamma$ isomer in the crude. The mixture was agitated for one hour at a temperature of 20 degrees centigrade whereupon solubility equilibrium between the ethanol and at least the $\alpha$ and $\gamma$ isomer was established. The mixture was then filtered to remove undissolved solids which weighed 723 grams when dry, containing 3 per cent $\gamma$ or 21.7 grams of $\gamma$. The filtrate, which weighed 1663 grams, was charged into an evaporator provided for agitation. Here, 767 grams, or about 50 per cent of the ethanol, was evaporated off and recovered for subsequent use. The solution remaining in the evaporator was cooled to about 18 degrees centigrade and maintained at that temperature, with agitation, for a period of one hour, at the end of which time the solution was filtered. There was recovered 61.4 grams of 93.7 per cent $\gamma$ isomer. This represents a 42.6 per cent recovery of the $\gamma$ isomer present in the crude hexachlorocyclohexane.

Example 4

A filtrate or mother liquor remaining after recovery of $\gamma$ isomer, in accordance with our process, but without the wash of the filter cake, was concentrated to a slurry, the solids filtered out, and the solids recycled by mixing with fresh crude hexachlorocyclohexane. After over 100 repetitions of this cycle of steps, the over-all yield of $\gamma$ isomer, of a purity of 93.8 per cent, was found to be about 64.9 per cent.

Example 5

Sixty-six and three-tenths parts of filtrate, made by a methanol extraction of crude hexachlorocyclohexane of substantially the analysis of Example 1 with 1.3 times its weight of methanol, containing 12.6 parts of dissolved solids, of which 5.6 parts were the γ isomer, was cooled to zero degrees centigrade, with agitation. One and one-half parts of 96.6 per cent pure γ isomer was recovered, representing a yield of 24.5 per cent of γ isomer in the filtrate.

*Example 6*

Example 5 was repeated, except that the solution was cooled to −15 degrees centigrade. Two and one-half parts of 98.5 per cent pure γ isomer was recovered, representing a yield of 42.6 per cent, based on the γ in the solution.

*Example 7*

Example 5 was repeated, except that the solution was cooled to −30 degrees centigrade. Two and six-tenths parts of 96.7 per cent pure γ isomer, representing a yield of 47 per cent, was recovered.

*Example 8*

Example 5 was repeated, except that the solution was cooled to −45 degrees centigrade. Three and one-tenth parts of 96.7 per cent pure γ isomer was recovered, representing a yield of 53.4 per cent of the γ isomer in the filtrate.

*Example 9*

Example 5 was repeated, except that the solution was cooled to −62 degrees centigrade. Three and three-tenths parts of 97.5 per cent pure γ isomer was recovered, representing a yield of 59 per cent of the γ isomer in the solution.

LIMITATIONS

Various modifications may be made in the method of the present invention without departing from the spirit or scope thereof. For example, instead of extracting at room temperature, we may extract at a higher temperature, and if the extraction be carried out under pressure, the temperature may be as high as the boiling point of the solvent.

Similarly, instead of cooling to the very low temperature of the examples, by extracting at a higher temperature, we may bring about supersaturation at room temperatures; also, we do not wish to be limited to cooling to the temperature of Example 9, as the degree of cooling is only limited by the freezing point of the solvent. In general, we contemplate cooling to a temperature of 50 to 100 centigrade degrees below the extracting temperature.

We claim:

1. The process which includes: mixing one part of crude hexachlorocyclohexane containing at least 10 per cent by weight of the γ-hexachlorocyclohexane isomer with more than about 1.1 parts of substantially anhydrous methanol until saturation of the methanol occurs with respect to at least the α- and γ-hexachlorocyclohexane isomers; evaporating said saturated solution until at least about 20 per cent of the volume of the solution has been evaporated and the remaining solution is supersaturated with respect to at least the α isomer; and, separating the γ-hexachlorocyclohexane isomer which crystallizes from solution before any substantial amount of α or other hexachlorocyclohexane isomer crystallizes from solution.

2. The process which includes: extracting with at least 1.1 part by weight of a substantially anhydrous organic solvent a mixture of hexachlorocyclohexane isomers containing a minor proportion of the γ isomer and a major proportion of other isomers including the α isomer, to produce a solution containing substantially all of the γ isomer and a substantial proportion of at least the α isomer; separating the undissolved solids; bringing the solution to a state of supersaturation at least with respect to the α isomer; and, recovering the γ isomer from said supersaturated solution as the first crop of crystals obtained.

3. The process according to claim 2, wherein: the bringing of the filtered extract to a state of supersaturation at least with respect to the α isomer is accomplished by chilling.

4. The process according to claim 2, wherein: the bringing of the filtered extract to a state of supersaturation at least with respect to the α isomer is accomplished by evaporation.

5. The process according to claim 2, wherein: the bringing of the filtered extract to a state of supersaturation at least with respect to the α isomer is accomplished by evaporation and cooling.

6. The process according to claim 2, wherein: the organic solvent is a lower aliphatic monohydric alcohol.

7. The process according to claim 2, wherein: the organic solvent is methyl monohydric alcohol and is employed in a weight ratio in the range between about 1.5 and about 1.6 parts of alcohol per part of crude hexachlorocyclohexane.

8. The process which includes: mixing one part of crude hexachlorocyclohexane containing about 13 percent by weight of the gamma hexachlorocyclohexane isomer with about 1.5 parts of methanol until saturation of the methanol occurs with respect to at least the alpha and gamma hexachlorocyclohexane isomers; separating the undissolved solids; evaporating said saturated solution until about 40 percent of the volume of the solution has been evaporated; cooling the remaining solution until supersaturated with respect to at least the alpha isomer; and, separating the gamma hexachlorocyclohexane isomer which crystallizes from solution before any substantial amount of alpha or other hexachlorocyclohexane isomer crystallizes from solution.

References Cited in the file of this patent

UNITED STATES PATENTS

| | | |
|---|---|---|
| 2,438,900 | Cooke et al. | Apr. 6, 1948 |

FOREIGN PATENTS

| | | |
|---|---|---|
| 447,048 | Great Britain | May 7, 1936 |
| 573,693 | Great Britain | Dec. 3, 1945 |

OTHER REFERENCES

Leeds: "Jour. Am. Chem. Soc.," vol. 2, pages 205–7 (1880).